(12) United States Patent
Ishikawa et al.

(10) Patent No.: US 7,514,522 B2
(45) Date of Patent: Apr. 7, 2009

(54) METHOD FOR PRODUCING POLYCARBONATE COPOLYMER

(75) Inventors: Yasuhiro Ishikawa, Chiba (JP); Koichi Suga, Chiba (JP); Yoshio Ikeda, Chiba (JP); Masatoshi Saitou, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 224 days.

(21) Appl. No.: 10/587,974

(22) PCT Filed: Feb. 17, 2005

(86) PCT No.: PCT/JP2005/002421

§ 371 (c)(1),
(2), (4) Date: Aug. 3, 2006

(87) PCT Pub. No.: WO2005/080468

PCT Pub. Date: Sep. 1, 2005

(65) Prior Publication Data

US 2008/0221295 A1    Sep. 11, 2008

(30) Foreign Application Priority Data

Feb. 19, 2004 (JP) ............................. 2004-042493
Feb. 19, 2004 (JP) ............................. 2004-042494

(51) Int. Cl.
  *C08G 64/00* (2006.01)
  *C08G 63/02* (2006.01)
(52) U.S. Cl. .................. 528/196; 525/67; 525/436; 525/464; 528/176; 528/198
(58) Field of Classification Search .............. 525/67, 525/436, 464; 528/176, 196, 198
See application file for complete search history.

(56) References Cited

U.S. PATENT DOCUMENTS 4,607,070 A    8/1986    Schreckenberg et al.

OTHER PUBLICATIONS

U.S. Appl. No. 11/571,020, filed Dec. 20, 2006, Suga et al.
U.S. Appl. No. 10/587,974, filed Aug. 3, 2006, Ishikawa et al.
U.S. Appl. No. 10/587,974, filed Aug. 3, 2006, Ishikawa et al.
U.S. Appl. No. 10/588,905, filed Aug. 9, 2006, Ishikawa et al.
Dae-Hyung Kim, et al., Modeling and Analysis of a Gas Sweeping Process for Polycarbonate Polymerization, Journal of Applied Polymer Science, vol. 88, 1010-1021 (2003).

*Primary Examiner*—Terressa M Boykin
(74) *Attorney, Agent, or Firm*—Oblon, Spivak, McClelland, Maier & Neustadt, P.C.

(57) ABSTRACT

A method for producing a polycarbonate copolymer having structural repeating units represented by formulas (I) and (II):

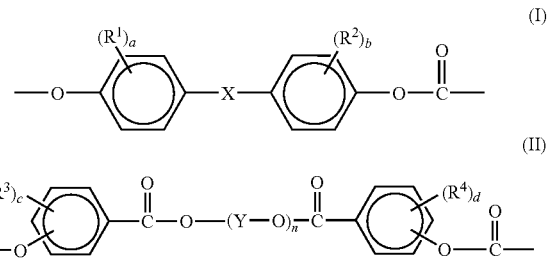

wherein each of $R^1$ and $R^2$, X, $R^3$, $R^4$, Y, a to d and n are defined in the application by reacting (A) a dihydric phenol, (B) a phenol-modified diol and (C) a carbonate precursor, wherein the phenol-modified diol is contains 500 ppm by mass or less of a hydroxybenzoic acid.

10 Claims, 1 Drawing Sheet

[F1]
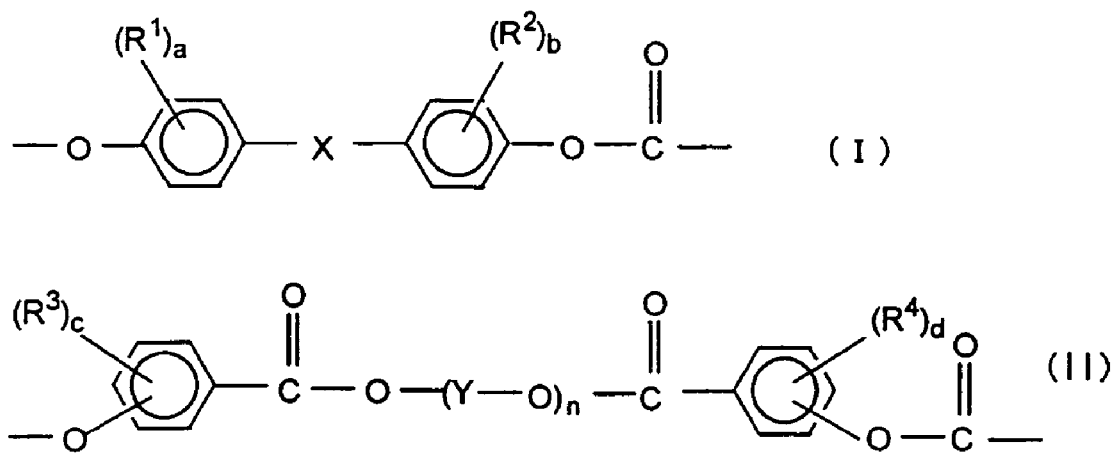

METHOD FOR PRODUCING POLYCARBONATE COPOLYMER

TECHNICAL FIELD

The present invention relates to a method for producing a polycarbonate copolymer from a diester diol through interfacial polymerization, to thereby produce a polycarbonate copolymer having a specific structure at high productivity.

The present invention also relates to a comonomer for producing polycarbonate resin, the comonomer comprising a high-purity diester diol, and to a method for producing the comonomer.

BACKGROUND ART

Polycarbonate (hereinafter may be abbreviated as PC) resins which are formed of an aromatic polycarbonate unit and an aliphatic polyether unit are known to have high toughness. There has been disclosed an exemplary method for producing such a polycarbonate, the method including copolymerizing a phenol-modified diol (diester diol) which has been derived from p-hydroxybenzoic acid, an alkyl ester thereof, or an acid chloride thereof, and a diol (see, for example, Patent Document 1). Specifically, PC copolymers produced through copolymerization of tetramethylene glycol (molecular weight: 2,000)-bis(4-hydroxybenzoate) or polyethylene glycol (molecular weight: 8,000)-bis(4-hydroxybenzoate) have been proposed. These PC copolymers formed from a diester diol can be produced through a conventional interfacial polymerization method. However, during a step of washing polymerization liquid, the methylene chloride phase containing a PC copolymer and the aqueous phase containing impurities are difficult to separate from each other. Thus, high-purity PC copolymers fail to be obtained, or high-purity PC copolymers are produced merely at considerably low productivity, which is problematic.

Although PC resin is widely employed as a transparent resin having high impact strength, there is continuous demand for improvement in other properties of PC resin. One known approach for improvement is copolymerization of a compound having a structure other than bisphenol A (e.g., introduction of aliphatic chain), whereby flowability of the resin is enhanced.

In the production method disclosed in Patent Document 1, poly(alkylene ether glycol)-bis(hydroxybenzoate ester) is employed as a phenol-modified diol. Before use, the poly(alkylene ether glycol)-bis(hydroxybenzoate ester) is not subjected to purification.

In addition to production of PC resin, use of poly(alkylene ether glycol)-bis(hydroxybenzoate ester) has been proposed for producing polyurethane and epoxy resin, and a synthesis method thereof is disclosed (see, for example, Patent Document 2 or 3). However, the Patent Documents do not disclose purification of the phenol-modified diol.

PC resin can be produced through a method such as interfacial polymerization or melt polymerization. In the case where PC copolymer is produced through interfacial polymerization of poly(alkylene ether glycol)-bis(hydroxybenzoate ester) serving as a starting material, separation of the aqueous phase from the organic phase performed in the washing step takes a long time or becomes difficult, which is problematic.

[Patent Document 1]
Japanese Patent Application Laid-Open (kokai) No. 62-79222

[Patent Document 2]
Japanese Patent Application Laid-Open (kokai) No. 60-79072

[Patent Document 3]
Japanese Patent Application Laid-Open (kokai) No. 2002-173465

DISCLOSURE OF THE INVENTION

Problems to be Solved by the Invention

The present invention has been conceived under such circumstances, and an object of the invention is to provide a method for producing a PC copolymer having a specific structure from a diester diol serving as a starting material, which method attains enhanced productivity.

Another object of the invention is to provide a comonomer for producing a PC resin, the comonomer comprising a high-purity diester diol, which facilitates separation of the aqueous phase and the organic phase during production of a PC copolymer from a diester diol. Still another object is to provide a method for producing the comonomer.

Means for Solving the Problems

The present inventors have conducted extensive studies in order to solve the aforementioned problems, and have found that use of a starting material yielded through removal of a specific impurity from a conventionally produced diester diol can remarkably facilitate separation of the methylene chloride phase containing a PC resin from the aqueous phase containing impurities during a step of washing polymerization liquid.

The present inventors have also found that the aforementioned objects can be attained by controlling the amount of impurity which originates from synthesis starting material and which is contained in poly(alkylene ether glycol)-bis(hydroxybenzoate ester) represented by formula (IIa) shown hereinbelow. The present invention has been accomplished on the basis of these findings.

Accordingly, the present invention provides a method for producing a polycarbonate copolymer, a comonomer for producing a polycarbonate resin, and a method for producing the comonomer, as follows.

BRIEF DESCRIPTION OF THE DRAWINGS

The figure shows the structures of the repeating units (I) and (II) of the polycarbonate copolymer of the invention.

1. A method for producing a polycarbonate copolymer through interfacial polymerization, the copolymer having structural repeating units represented by formulas (I) and (II):

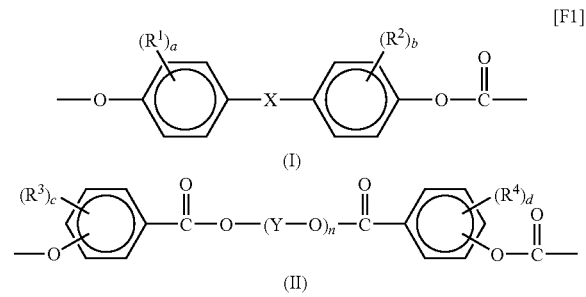

(wherein each of $R^1$ and $R^2$ represents a C1 to C6 alkyl group; X represents a single bond, a C1 to C8 alkylene group, a C2 to C8 alkylidene group, a C5 to C15 cycloalkylene group, a C5 to C15 cycloalkylidene group, —S—, —SO—, —SO$_2$—, —O—, —CO—, or a bond represented by formula (III-1) or (III-2):

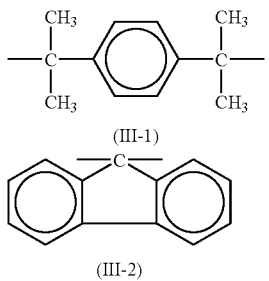

each of $R^3$ and $R^4$ represents a C1 to C3 alkyl group; Y represents a C2 to C15 linear-chain or branched alkylene group; a to d are integers of 0 to 4; and n is an integer of 2 to 450), characterized in that a phenol-modified diol having a hydroxybenzoic acid content of 500 ppm by mass or less is employed as a starting material.

2. A method for producing a polycarbonate copolymer as described in 1 above, wherein the phenol-modified diol has a hydroxybenzoic acid alkyl ester content of 1.0 mass % or less.

3. A method for producing a polycarbonate copolymer as described in 1 or 2 above, wherein the hydroxybenzoic acid is p-hydroxybenzoic acid.

4. A method for producing a polycarbonate copolymer as described in 2 or 3 above, wherein the hydroxybenzoic acid alkyl ester is a p-hydroxybenzoic acid alkyl ester.

5. A comonomer for producing a polycarbonate resin represented by formula (IIa):

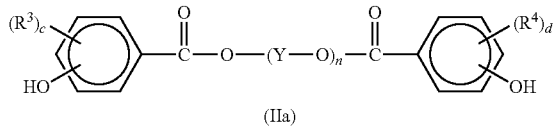

(wherein each of $R^3$ and $R^4$ represents a C1 to C3 alkyl group; Y represents a C2 to C15 linear-chain or branched alkylene group; c and d are integers of 0 to 4; and n is an integer of 2 to 450), characterized in that the comonomer contains an impurity which is a hydroxybenzoic acid represented by formula (IV):

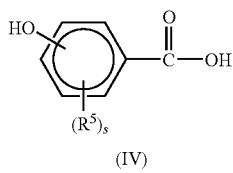

(wherein $R^5$ is a C1 to C3 alkyl group, and s is an integer of 0 to 4) in an amount of 500 ppm by mass or less.

6. A comonomer for producing a polycarbonate resin as described in 5 above, in which the amount of a hydroxybenzoic acid alkyl ester acting as an impurity and represented by formula (V):

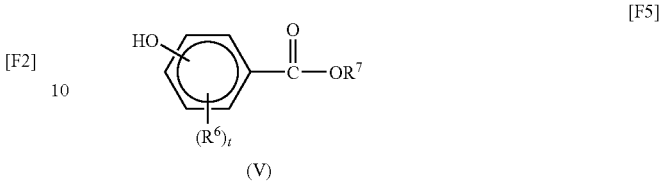

(wherein $R^6$ is a C1 to C3 alkyl group; $R^7$ is a C1 to C10 alkyl group; and t is an integer of 0 to 4) is 1.0 mass % or less.

7. A comonomer for producing a polycarbonate resin as described in 5 or 6 above, wherein n in formula (IIa) is 2 to 200.

8. A comonomer for producing a polycarbonate resin as described in any of 5 to 7 above, which is produced through esterification between a poly(alkylene ether glycol) and a hydroxybenzoic acid represented by formula (IV):

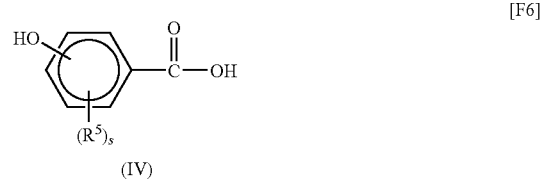

(wherein $R^5$ is a C1 to C3 alkyl group, and s is an integer of 0 to 4) or a hydroxybenzoic acid alkyl ester represented by formula (V):

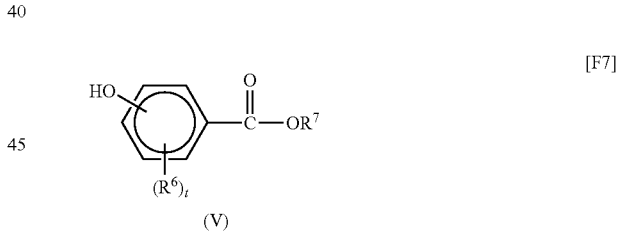

(wherein $R^6$ is a C1 to C3 alkyl group; $R^7$ is a C1 to C10 alkyl group; and t is an integer of 0 to 4).

9. A method for producing a comonomer for producing a polycarbonate resin, characterized by comprising esterifying between a poly(alkylene ether glycol) and a hydroxybenzoic acid represented by formula (IV):

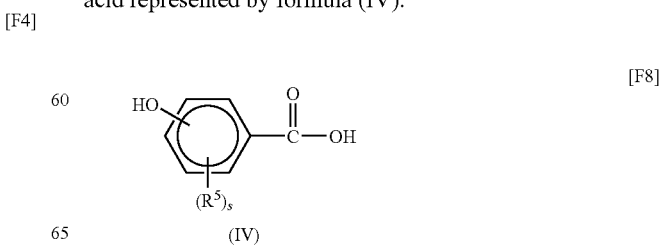

(wherein $R^5$ is a C1 to C3 alkyl group, and s is an integer of 0 to 4) or a hydroxybenzoic acid alkyl ester represented by formula (V):

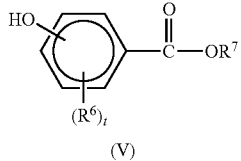

(V)

[F9]

(wherein $R^6$ is a C1 to C3 alkyl group; $R^7$ is a C1 to C10 alkyl group; and t is an integer of 0 to 4), to thereby yield a reaction mixture containing a compound represented by formula (IIa):

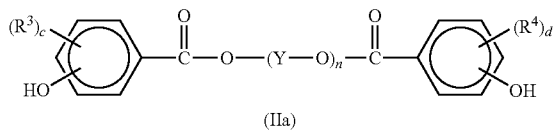

(IIa)

[F10]

(wherein each of $R^3$ and $R^4$ represents a C1 to C3 alkyl group; Y represents a C2 to C15 linear-chain or branched alkylene group; c and d are integers of 0 to 4; and n is an integer of 2 to 450), and, subsequently, treating the reaction mixture with an aqueous alkaline solution.

10. A method for producing a comonomer for producing a polycarbonate resin as described in 9 above, wherein the aqueous alkaline solution has a pH of 8 to 11.

EFFECTS OF THE INVENTION

According to the present invention, the steps of the method for producing a PC copolymer having a specific structure from a diester diol serving as a starting material can be facilitated and reduced in number, and the impurity level of PC copolymer can be reduced.

The present invention also provides a high-purity diester diol serving as a starting material suitable for the method for producing a PC copolymer through interfacial polymerization employing a diester diol.

BEST MODES FOR CARRYING OUT THE INVENTION

The PC copolymer produced through the production method of the present invention is a phenol-modified diol-copolymerized polycarbonate, and is produced through interfacial polymerization, which is a type of conventional production method. Specifically, in the method, a dihydric phenol, a phenol-modified diol, and a carbonate precursor such as phosgene are allowed to react. More specifically, a dihydric phenol, a phenol-modified diol, and a carbonate precursor such as phosgene are allowed to react in an inert solvent such as methylene chloride in the presence of a known acid acceptor or molecular-weight-modifier and an optional catalyst or branching agent.

In the present invention, a dihydric phenol described hereinbelow and a phenol-modified diol are copolymerized through interfacial polymerization, whereby there can be produced a PC copolymer having structural repeating units represented by formula (I) and (II):

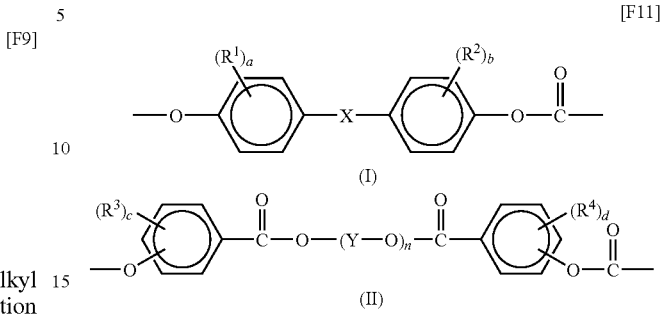

[F11]

(wherein $R^1$ to $R^4$, X, Y, a to d, and n will be described hereinbelow). Examples of the dihydric phenol include those represented by formula (Ia).

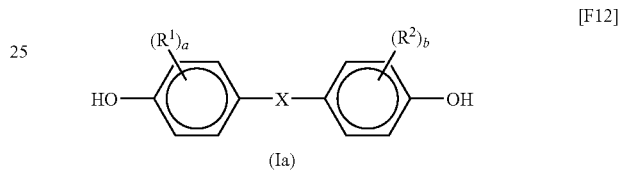

(Ia)

[F12]

In formula (Ia), each of $R^1$ and $R^2$ represents a C1 to C6 alkyl group, and the alkyl group may be linear-chain, branched, or cyclic. Specific examples of the alkyl group include methyl, ethyl, n-propyl, isopropyl, n-butyl, isobutyl, tert-butyl, n-pentyl, isopentyl, n-hexyl, isohexyl, cyclopentyl, and cyclohexyl. The numerals a and b represent the number of substituent(s) of $R^1$ and that of $R^2$, respectively, and each numeral is an integer of 0 to 4. When a plurality of R's are present, these R's may be identical to or different from one another, and when a plurality of $R^2$s are present, these $R^2$s may be identical to or different from one another.

X represents a single bond, a C1 to C8 alkylene group (e.g., methylene, ethylene, propylene, butylene, pentylene, or hexylene), a C2 to C8 alkylidene group (e.g., ethylidene or isopropylidene), a C5 to C15 cycloalkylene group (e.g., cyclopentylene or cyclohexylene), a C5 to C15 cycloalkylidene group (e.g., cyclopentylidene or cyclohexylidene), —S—, —SO—, —SO$_2$—, —O—, —CO—, or a bond represented by formula (III-1) or (III-2).

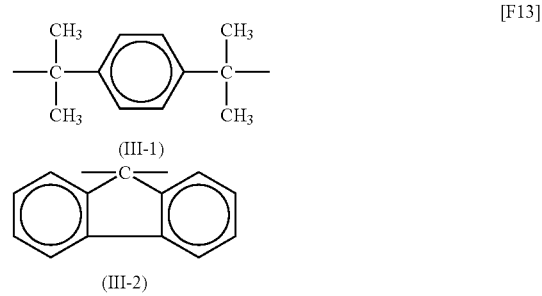

[F13]

There are a variety of dihydric phenols represented by the above formula (Ia). Among them, 2,2-bis(4-hydroxyphenyl)

propane (so-called bisphenol A) is particularly preferred. Examples of bisphenols other than bisphenol A include bis (hydroxyaryl)alkanes such as bis(4-hydroxyphenyl)methane, 1,1-bis(4-hydroxyphenyl)ethane, 2,2-bis(4-hydroxyphenyl) butane, 2,2-bis(4-hydroxyphenyl)octane, 2,2-bis(4-hydroxyphenyl)phenylmethane, 2,2-bis(4-hydroxy-3-methylphenyl)propane, bis(4-hydroxyphenyl)naphthylmethane, 1,1-bis (4-hydroxy-t-butylphenyl)propane, 2,2-bis(4-hydroxy-3-bromophenyl)propane, 2,2-bis(4-hydroxy-3,5-tetramethylphenyl)propane, 2,2-bis(4-hydroxy-3-chlorophenyl)propane, 2,2-bis(4-hydroxy-3,5-tetrachlorophenyl)propane, and 2,2-bis(4-hydroxy-3,5-tetrabromophenyl)propane; bis(hydroxyaryl)cycloalkanes such as 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, and 2,2'-bis(4-hydroxyphenyl)norbornene; dihydroxyaryl ethers such as 4,4'-dihydroxyphenyl ether and 4,4'-dihydroxy-3,3'-dimethylphenyl ether; dihydroxydiaryl sulfides such as 4,4'-dihydroxydiphenyl sulfide and 4,4'-dihydroxy-3,3'-dimethyldiphenyl sulfide; dihydroxydiaryl sulfoxides such as 4,4'-dihydroxydiphenyl sulfoxide and 4,4'-dihydroxy-3,3'-dimethyldiphenyl sulfoxide; dihydroxydiaryl sulfones such as 4,4'-dihydroxydiphenyl sulfone and 4,4'-dihydroxy-3,3'-dimethyldiphenyl sulfone; dihydroxydiphenyls such as 4,4'-dihydroxydiphenyl; dihydroxydiarylfluorenes such as 9,9-bis(4-hydroxyphenyl)fluorene and 9,9-bis(4-hydroxy-3-methylphenyl)fluorene; dihydroxydiaryladamantanes such as bis(4-hydroxyphenyl) diphenylmethane, 1,3-bis(4-hydroxyphenyl)adamantane, 2,2-bis(4-hydroxyphenyl)adamantane, and 1,3-bis(4-hydroxyphenyl)-5,7-dimethyladamantane; bis(4-hydroxyphenyl)diphenylmethane; 4,4'-[1,3-phenylenebis(1-methylethylidene)]bisphenol; 10,10-bis(4-hydroxyphenyl)-9-anthrone; 1,5-bis(4-hydroxyphenylthio)-2,3-dioxapentaene; and α,ω-bishydroxyphenylpolydimethylsiloxane compounds. These dihydric phenols may be used singly or in combination of two or more species.

A variety of molecular-weight-modifiers may be employed so long as the modifiers can be generally employed in polymerization to form PC resin. Specific examples of monohydric phenols include phenol, o-n-butylphenol, m-n-butylphenol, p-n-butylphenol, o-isobutylphenol, m-isobutylphenol, p-isobutylphenol, o-t-butylphenol, m-t-butylphenol, p-t-butylphenol, o-n-pentylphenol, m-n-pentylphenol, p-n-pentylphenol, o-n-hexylphenol, m-n-hexylphenol, p-n-hexylphenol, p-t-octylphenol, o-cyclohexylphenol, m-cyclohexylphenol, p-cyclohexylphenol, o-phenylphenol, m-phenylphenol, p-phenylphenol, o-n-nonylphenol, m-nonylphenol, p-n-nonylphenol, o-cumylphenol, m-cumylphenol, p-cumylphenol, o-naphthylphenol, m-naphthylphenol, p-naphthylphenol, 2,5-di-t-butylphenol, 2,4-di-t-butylphenol, 3,5-di-t-butylphenol, 2,5-dicumylphenol, 3,5-dicumylphenol, p-cresol, bromophenol, tribromophenol, monoalkylphenols having a linear-chain or branched alkyl group having carbon atoms 12 to 35 (average) at o-, m-, or p-position, 9-(4-hydroxyphenyl)-9-(4-methoxyphenyl)fluorene, 9-(4-hydroxy-3-methylphenyl)-9-(4-methoxy-3-methylphenyl)fluorene, and 4-(1-adamantyl)phenol. Among these monohydric phenols, p-t-butylphenol, p-cumylphenol, p-phenylphenol, etc. are preferably employed.

A phase-transfer catalyst is preferably employed as the catalyst, and examples include tertiary amines and salts thereof, quaternary ammonium salts, and quaternary phosphonium salts. Examples of the tertiary amine include trithylamine, tributylamine, N,N-dimethylcyclohexylamine, pyridine, and dimethylaniline. Examples of the tertiary amine salt include hydrochlorides and hydrobromides of the above tertiary amines. Examples of the quaternary ammonium salt include trimethylbenzylammonium chloride, triethylbenzylammonium chloride, tributylbenzylammonium chloride, trioctylmethylammonium chloride, tetrabutylammonium chloride, and tetrabutylammonium bromide. Examples of the quaternary phosphonium salt include tetrabutylphosphonium chloride and tetrabutylphosphonium bromide. These catalysts may be used singly or in combination of two or more species. Among the above catalysts, tertiary amines are preferred, with triethylamine being particularly A variety of inert organic solvents may be employed. Examples include chlorinated hydrocarbons such as dichloromethane (methylene chloride), trichloromethane, carbon tetrachloride, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, and chlorobenzene; toluene; and acetophenone. These organic solvents may be used singly or in combination of two or more species. Of these, methylene chloride is preferred.

A compound having three or more functional groups may be employed as the branching agent. Specific examples of include 1,1,1-tris(4-hydroxyphenyl)ethane, 4,4'-[1-[4-[1-(4-hydroxyphenyl)-1-methylethyl]phenyl]ethylidene]bisphenol, α,α',α''-tris(4-hydroxyphenyl)-1,3,5-triisopropylbenzene, 1-[α-methyl-α-(4'-hydroxyphenyl)ethyl]-4-[α',α'-bis (4''-hydroxyphenyl)ethyl]benzene, phloroglucin, trimellitic acid, and isatinbis(o-cresol).

The phenol-modified diol employed in the present invention is a compound represented by formula (IIa):

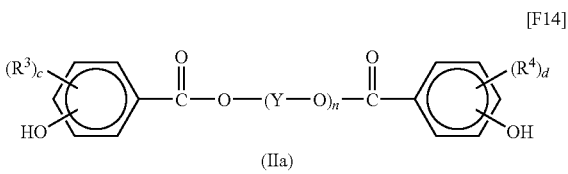

[F14]

(IIa)

(wherein each of $R^3$ and $R^4$ represents a C1 to C3 alkyl group, Y represents a C2 to C15 linear-chain or branched alkylene group, c and d are integers of 0 to 4, and n is an integer of 2 to 450).

Examples of the alkyl group denoted by $R^3$ or $R^4$ include methyl, ethyl, n-propyl, and isopropyl. When a plurality of $R^3$s are present, these $R^3$s may be identical to or different from one another, and when a plurality of $R^4$s are present, these $R^4$s may be identical to or different from one another. Examples of the C2 to C15 linear-chain or branched alkylene group denoted by Y include alkylene groups such as ethylene, propylene, butylene, isobutylene, pentylene, and isopentylene; and alkylidene residues such as ethylidene, propylidene, isopropylidene, butylidene, isobutylidene, pentylidene, and isopentylidene. The "n" is preferably 2 to 200, more preferably 6 to 70.

The phenol-modified diol represented by the aforementioned formula (IIa) is a compound derived from hydroxybenzoic acid, an alkyl ester thereof, or an acid chloride thereof, and a polyether-diol. Typical examples of the hydroxybenzoic acid alkyl ester include methyl hydroxybenzoate and ethyl hydroxybenzoate. Polyether-diol is represented by HO—(Y—O)$_n$—H and is formed of repeatedly linked C2 to C15 linear-chain or branched alkyl ether units. Specific examples include polyethylene glycol, polypropylene glycol, and polytetramethylene glycol. Of these, polytetramethylene glycol is particularly preferred from the viewpoint of availability and hydrophobicity. The recurring number (n) of the ether moiety of polyether-diol is preferably 2 to 200, more preferably 6 to 70. When n is 2 or more, phenol-modified diol can be effectively copolymerized, whereas when n is 70 or less, drop in heat resistance is small. Needless to say, both cases are advantageous.

A typical example of the acid chloride is hydroxybenzoyl chloride obtained from hydroxybenzoic acid and phosgene. More specifically, the acid chloride may be produced through a method disclosed in Japanese Patent No. 2652707 or other documents. Hydroxybenzoic acid or an alkyl ester thereof may be a p-, m-, or o-form. From the viewpoint of copolymerization reaction, a p-form is preferred. An o-form may exhibit poor copolymerization reactivity due to steric hindrance the hydroxyl group.

The phenol-modified diol employed in the present invention must have a hydroxybenzoic acid content of 500 ppm by mass or less, preferably 100 ppm by mass or less. In a preferred approach, hydroxybenzoic acid species are removed from a phenol-modified diol on the basis of difference in solubility in water between the hydroxybenzoic acid compound and the phenol-modified diol. When the method is employed, conditions such as temperature, pH, stirring conditions, separation conditions, and solvent may be appropriately selected.

The phenol-modified diol employed in the present invention preferably has a hydroxybenzoic acid alkyl ester content of 1.0 mass % or less, more preferably 0.5 mass % or less. In a preferred approach, a hydroxybenzoic acid alkyl ester is removed from a phenol-modified diol through a method in which a hydroxybenzoic acid alkyl ester is distilled out under reduced pressure, the method disclosed in Japanese Patent Application Laid-Open (kokai) No. 62-79222. In another effective approach, a hydroxybenzoic acid alkyl ester is hydrolyzed under alkaline conditions, to thereby form the corresponding hydroxybenzoic acid, which is then subjected to the aforementioned distillation treatment for removal.

The hydroxybenzoic acid present in the phenol-modified diol originates from a starting material for synthesizing the phenol-modified diol or a decomposed species of the starting material, whereas the hydroxybenzoic acid alkyl ester originates from a starting material for synthesizing the phenol-modified diol. Specific examples of the hydroxybenzoic acid and the hydroxybenzoic acid alkyl ester will be described hereinbelow.

In the production method of the present invention, the phenol-modified diol is as highly preferably as possible used in the form of methylene chloride solution in order to prevent degradation and other changes. In the case where the methylene chloride solution cannot be provided, an aqueous alkaline (e.g., NaOH) solution may also be employed.

In the production method of the present invention, when the proportion of copolymerized phenol-modified diol increases, flowability of the formed polymer is improved, but heat resistance decreases. Therefore, the proportion of copolymerized phenol-modified diol is preferably modified in consideration of the balance between flowability and heat resistance of interest. When the copolymerization proportion of phenol-modified diol is in excess of 40 mass %, the formed polymer assumes an elastomeric polymer, as disclosed in Japanese Patent Application Laid-Open (kokai) No. 62-79222. In this case, such a polymer may fail to find the same uses as of conventional PC resin. In order to maintain heat resistance to 100° C. or higher, the formed PC copolymer preferably contains phenol-modified diol residues in an amount of 1 to 20 mass %, more preferably 1 to 10 mass %.

The comonomer of the present invention for producing a PC resin is a compound represented by formula (IIa):

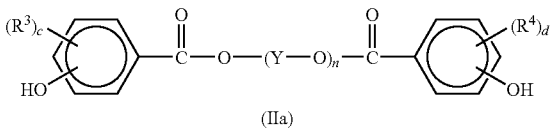

[F15]

(IIa)

(wherein $R^3$, $R^4$, Y, c, d, and n have the same meanings as defined above) and has an amount of a hydroxybenzoic acid acting as an impurity and represented by formula (IV):

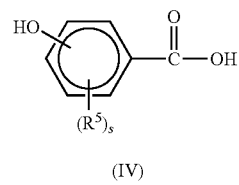

[F16]

(IV)

(wherein $R^5$ is a C1 to C3 alkyl group, and s is an integer of 0 to 4) of 500 ppm by mass or less. The hydroxybenzoic acid content is preferably 100 ppm by mass or less. In the aforementioned comonomer for producing a PC resin, through controlling the amount of impurity (hydroxybenzoic acid) to 500 ppm by mass or less, separation of the aqueous phase from the organic phase is facilitated during the washing step in the production of PC resin by interfacial polymerization.

Examples of the hydroxybenzoic acid represented by the above formula (IV) include p-hydroxybenzoic acid, m-hydroxybenzoic acid, o-hydroxybenzoic acid (salicylic acid), and these acids each having a C1 to C3 alkyl group substituent on the benzene ring.

In the present invention, the comonomer for producing a PC resin preferably has an amount of a hydroxybenzoic acid alkyl ester acting as an impurity and represented by formula (V):

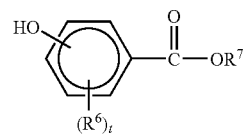

[F17]

(V)

(wherein $R^6$ is a C1 to C3 alkyl group; $R^7$ is a C1 to C10 alkyl group; and t is an integer of 0 to 4) of 1.0 mass % or less, more preferably 0.5 mass % or less. In the aforementioned comonomer for producing a PC resin, through controlling the amount of impurity (hydroxybenzoic acid alkyl ester) to 1.0 mass % or less, separation of the aqueous phase from the organic phase is further facilitated during the washing step in the production of PC resin by interfacial polymerization. In the above formula (V), examples of the C1 to C10 alkyl group denoted by $R^7$ include the aforementioned C1 to C3 alkyl groups, n-butyl, isobutyl, sec-butyl, t-butyl, pentyl, hexyl, octyl, 2-ethylhexyl, and decyl.

Examples of the hydroxybenzoic acid alkyl ester represented by the above formula (V) include alkyl esters of the hydroxybenzoic acids. Specific examples include methyl p-hydroxybenzoate, ethyl p-hydroxybenzoate, and n-propyl p-hydroxybenzoate.

The comonomer for producing a PC resin represented by the above formula (IIa) may be produced through esterification between the hydroxybenzoic acid represented by the above formula (IV) or the hydroxybenzoic acid alkyl ester represented by the above formula (V) and poly(alkylene ether glycol). Examples of the poly(alkylene ether glycol) include polymethylene ether glycol, polyethylene ether glycol, and polypropylene ether glycol.

In dehydration reaction (esterification) between the hydroxybenzoic acid and the poly(alkylene ether glycol), toluene, xylene, or similar solvent may be employed as a reaction solvent. The dehydration is performed while the system is co-boiled at the boiling temperature of the solvent so as to remove water. In the dehydration, a catalyst may be appropriately added to the system. Examples of the catalyst include sulfuric acid, phosphoric acid, p-toluenesulfonic acid, and organometallic catalysts containing a metal such as Ti or Sn.

In dehydration-condensation reaction (esterification) between the hydroxybenzoic acid alkyl ester and the poly(alkylene ether glycol), the two components are caused to react in an inert gas atmosphere (e.g., nitrogen) or under reduced pressure, while the alcohol corresponding to the alkyl ester is released. The reaction is generally performed in the absence of solvent at about 140 to 230° C. In the dehydration, a catalyst may be appropriately added to the system, and an organometallic catalyst containing a metal such as Ti or Sn may be employed as the catalyst.

In the present invention, the reaction mixture obtained through the esterification which mixture contains a compound represented by the above formula (IIa) is treated with an aqueous alkaline solution, whereby the amount of a hydroxybenzoic acid acting as an impurity and represented by the above formula (IV) and that of a hydroxybenzoic acid alkyl ester acting an impurity and represented by the above formula (V) can be reduced to the aforementioned predetermined levels or lower. In the above treatment with aqueous alkaline solution, the following procedure may be employed. Specifically, the reaction mixture is subjected to liquid-liquid extraction with the aqueous alkaline solution and an organic solvent, to thereby dissolve an impurity in the aqueous alkaline solution and dissolve the compound represented by the above formula (IIa) in the organic solvent, whereby the target compound is separated from the impurity.

The aforementioned aqueous alkaline solution employed in the treatment preferably has a pH of 8 to 11. When the aqueous alkaline solution has a pH of 8 or higher, relative amounts of impurities transferred into the organic solvent decrease, whereby purification performance can be enhanced. When the aqueous alkaline solution has a pH of 11 or lower, lower amounts of the compound represented by formula (IIa) are transferred into the aqueous alkaline solution, whereby product yield can be enhanced.

The aforementioned aqueous alkaline solution employed in the treatment may be an aqueous solution of an alkali metal (e.g., sodium or potassium) or an alkaline earth metal (e.g., magnesium or calcium) hydroxide, carbonate, or hydrogencarbonate.

No particular limitation is imposed on the type of the organic solvent so long as the solvent can dissolve the compound represented by formula (IIa) and can form two phases including an aqueous solution phase. Examples of employable organic solvents include aromatic hydrocarbons such as toluene and benzene; aliphatic and alicyclic hydrocarbons such as hexane, heptane, and cyclohexane; ethers such as diethyl ether and 1,4-dioxane; and halo-hydrocarbons such as chloroform and dichloromethane. The phase separation into the organic solvent phase and the aqueous phase may be performed stationarily or through centrifugation.

In order to effectively remove an alkyl hydroxybenzoate ester acting as an impurity, alkali hydrolysis may be performed, as a preliminary treatment, prior to the treatment with the aforementioned aqueous alkaline solution. The alkali hydrolysis may be performed under the same conditions as employed in the treatment with the aforementioned aqueous alkaline solution. Alternatively, hydrolysis may be performed at a pH of 11 or higher or under acidic conditions so as to accelerate reaction, followed by adjusting the pH to 8 to 11. During hydrolysis, the reaction system may be heated. The reaction field under which alkali hydrolysis is performed may be a single aqueous solution phase or an aqueous solution/organic solvent dual-phase.

EXAMPLES

The present invention will next be described in more detail by way of examples, which should not be construed as limiting the invention thereto. In the Examples hereinbelow, the impurity content was determined through the following method.

<Determination of Impurity Content>

Measurement was performed through HPLC (high-performance liquid chromatography) under the following conditions, and the impurity content was determined from the calibration curve given from the data of the standard sample.

Column: ODS-3, product of GL Science
Column temperature: 40° C.
Solvent: 0.5 mass % aqueous phosphoric acid-acetonitrile 1:2 (vol.)
Flow rate: 1.0 mL/min Comparative Example 1 and Example 1

Synthesis of Phenol-modified Diols (A-1) and (A-2)

Under nitrogen, polytetramethylene glycol (PTMG, Mn=1000) (100 g) and methyl p-hydroxybenzoic acid (33.4 g) were heated in the presence of dibutyltin oxide (0.5 g) at 220° C., and formed methanol was distilled out.

Under reduced pressure in the reaction system, excessive methyl p-hydroxybenzoate was removed, to thereby yield a crude product of phenol-modified diol (A-1) (Comparative Example 1). The crude product (A-1) (5.0 g) was dissolved in methylene chloride (30 mL), and a 8-mass % aqueous sodium hydrogencarbonate solution (10 mL) was added to the methylene chloride solution. The mixture was vigorously agitated for 20 minutes, and the methylene chloride phase was collected through centrifugation. The thus-collected methylene chloride phase was condensed under reduced pressure, to thereby yield a purified product of phenol-modified diol (A-2) (Example 1). The p-hydroxybenzoic acid content and the methyl p-hydroxybenzoate content of crude product (A-1) and purified product (A-2) were determined through HPLC (high-performance liquid chromatography) on the basis of the aforementioned method. The similar determination procedure was employed for phenol-modified diols produced in the Examples and Comparative Examples hereinbelow. Table 1 shows the results.

Examples 2 and 3

Synthesis of Phenol-modified Diols (A-3) and (A-4)

The procedure of Example 1 was repeated, but removal of excessive methyl p-hydroxybenzoate was terminated before completion of the removal. The thus-obtained phenol-modified diol (10 g) was dissolved in methylene chloride (60 mL), and a 8-mass % aqueous sodium hydrogencarbonate solution (20 mL) was added to the methylene chloride solution. The mixture was vigorously agitated for 20 minutes, and the methylene chloride phase was collected through centrifugation. The thus-collected methylene chloride phase was condensed under reduced pressure, to thereby yield phenol-modified diol (A-3) (Example 2).

The above-produced phenol-modified diol (A-3) and the phenol-modified diol (A-1) produced in Example 1 were mixed at a ratio by mass of 6:4, to thereby yield phenol-modified diol (A-4) (Example 3).

Comparative Example 2 and Examples 4 and 5

Synthesis of Phenol-modified Diols (B-1) to (B-3)

The procedures of Comparative Example 1 and Examples 1 and 2 were repeated, except that polytetramethylene glycol (Mn=2000) was used instead of polytetramethylene glycol (Mn=1000), to thereby yield phenol-modified diols (B-1) to (B-3), corresponding to phenol-modified diols (A-1) to (A-3), respectively.

Comparative Example 3 and Example 6

Synthesis of Phenol-modified Diols (C-1) and (C-2)

The procedures of Comparative Example 1 and Example 1 were repeated, except that polytetramethylene glycol (Mn=600) was used instead of polytetramethylene glycol (Mn=1000), to thereby yield phenol-modified diol crude product (C-1) and phenol-modified diol purified product (C-2), respectively.

Comparative Example 4 and Example 7

Synthesis of Phenol-modified Diols (D-1) and (D-2)

The procedures of Comparative Example 1 and Example 1 were repeated, except that polytetramethylene glycol (Mn=2900) was used instead of polytetramethylene glycol (Mn=1000), to thereby yield phenol-modified diol crude product (D-1) and phenol-modified diol purified product (D-2), respectively.

Comparative Example 5 and Example 8

Synthesis of Phenol-modified Diols (E-1) and (E-2)

The procedures of Comparative Example 1 and Example 1 were repeated, except that polyethylene glycol (PEG) (Mn=400) was used instead of polytetramethylene glycol (Mn=1000), to thereby yield phenol-modified diol crude product (E-1) and phenol-modified diol purified product (E-2), respectively.

Example 9

Production of Polycarbonate Copolymer (1) PC Oligomer Synthesizing Step

To a 5.6-mass % aqueous sodium hydroxide solution, sodium dithionite was added in an amount of 0.2 mass % with respect to bisphenol A (BPA), which was to be added to the aqueous solution. Then, the BPA was dissolved in the aqueous solution in such an amount that the BPA concentration was adjusted to 13.5 mass %, whereby an aqueous sodium hydroxide solution of BPA was prepared. The aqueous sodium hydroxide solution of BPA was continuously fed to a tube reactor (inner diameter: 6 mm, tube length: 30 m) at 40 L/hr, and methylene chloride and phosgene were also continuously fed to the reactor at 15 L/hr and 4.0 kg/hr, respectively. The tube reactor has a jacket section, through which cooling water was circulated so as to maintain the reaction mixture at 40° C. or lower.

The reaction mixture supplied through the tube reactor was continuously fed to a tank reactor (inner volume: 40 L) equipped with a retreated blade and a baffle plate. To the tank reactor, the aqueous sodium hydroxide solution of BPA (2.8 L/hr), a 25-mass % aqueous sodium hydroxide solution (0.07 L/hr), water (17 L/hr), and a 1-mass % aqueous triethylamine solution (0.64 L/hr) were fed, and the mixture was allowed to react at 29 to 32° C. The reaction mixture was continuously removed from the tank reactor and allowed to stand, whereby the aqueous phase was separated out and the methylene chloride phase was collected. The thus-produced polycarbonate oligomer solution was found to have an oligomer concentration of 329 g/L and a chloroformate concentration of 0.74 mol/L.

(2) Polymerization Step for Producing PC Copolymer

Into a tank reactor (inner volume: 1 L) equipped with baffle plates and a paddle-form agitation blade, the oligomer solution (137 mL), the phenol-modified diol methylene chloride solution (A-2) produced in Example 1, and triethylamine (85 μL) were placed. To the mixture, a 6.4-mass % aqueous sodium hydroxide solution (19.2 g) was added under stirring, and the mixture was allowed to react for 10 minutes. Subsequently, a PTBP methylene chloride solution (PTBP (1.47 g) dissolved in methylene chloride (10 mL)), and an aqueous BPA sodium hydroxide solution (NaOH (4.90 g) and sodium dithionite (16 mg) dissolved in water (71 mL), then BPA (8.06 g) dissolved in the aqueous solution) was added to the reaction mixture, and the resultant mixture was allowed to polymerize for 50 minutes.

The polymerization product was diluted with methylene chloride (100 mL), followed by stirring for 10 minutes. An aliquot (50 mL) of the polymerization liquid was taken into a 50-mL messcylinder and was left to stand. Separation of the liquid into the aqueous phase and the methylene chloride phase was observed. The remaining polymerization liquid was centrifuged, thereby collecting another methylene chloride phase. The methylene chloride phase (240 mL) was placed in the reactor which had been employed for polymerization. A 0.03-mol/L aqueous NaOH solution (42 mL) was added to the methylene chloride phase, and the mixture was stirred for 10 minutes. The liquid mixture (50 mL) was taken into a 50-mL messcylinder and was left to stand. Separation of the liquid into the aqueous phase and the methylene chloride phase was observed.

The remaining polymerization liquid was centrifuged, thereby collecting another methylene chloride phase. The methylene chloride phase (150 mL) was washed with 0.2- mol/L hydrochloric acid then twice with deionized water, for purification. Solvent was removed from the thus-purified methylene chloride phase, to thereby yield a purified PC copolymer. Viscosity number, copolymerization proportion, and glass transition temperature Tg of the PC copolymer were determined through the following procedures. Table 1 shows the results.

(1) Determination of Viscosity Number

Determined in accordance with ISO 1628-4 (1999)

(2) Determination of Copolymerization Proportion $^1$H-NMR of the copolymer was measured. Proton (underlined) peaks were assigned as follows.

$\delta$1.4-1.9: C$\underline{H}_3$ (BPA), —O—CH$_2$—C$\underline{H}_2$—C$\underline{H}_2$—CH$_2$—

$\delta$3.3-3.5: —O—C$\underline{H}_2$—CH$_2$—CH$_2$—C$\underline{H}_2$—

$\delta$4.3-4.4: —CO—O—C$\underline{H}_2$—CH$_2$—C$\underline{H}_2$—CH$_2$—

From the respective integral peak strengths, the ratio by mole of the phenol-modified diol carbonate segment represented by the above formula (II) to the BPA carbonate segment represented by the above formula (I) was calculated, and the value was reduced to a mass-based value. One example of the calculation procedure is as follows.

Calculation Example

When the integral peak values of $\delta$1.4-1.9, $\delta$3.3-3.5, and $\delta$4.3-4.4 are 858.6, 118.7, and 10.21, respectively, unit repetition number (n) is as follows.

$n = 118.7 \div 10.21 + 1 = 12.6$

Thus, BPA peak value and phenol-modified diol peak value are as follows.

$BPA = [(858.6 - 118.7 - 10.21)/6] = 121.6$ phenol-modified diol $= (10.21/4) = 2.55$ The ratio by mole of the BPA carbonate segment is calculated to be 97.9 mol % through the following relationship.

$[(858.6 - 118.7 - 10.21)/6]/\{(10.21/4) + [(858.6 - 118.7 - 10.21)/6]\} \times 100 = 97.9$ mol %

The ratio by mole of the phenol-modified diol carbonate segment is calculated to be 2.05 mol % through the following relationship.

$(10.21/4)/\{(10.21/4) + [(858.6 - 118.7 - 10.21)/6]\} \times 100 = 2.05$ mol %

Accordingly, the proportion of copolymerized phenol-modified diol carbonate segment [mass %] is calculated to be 8.6 mass % through the following relationship.

$2.05 \times (136 + 120 + 12.6 \times 72 + 12 + 16) \div (2.05 \times (136 + 120 + 12.6 \times 72 + 12 + 16) + 97.9 \times 254) \times 100 = 8.9$ mass %

(3) Determination of Glass Transition Temperature Tg

Determined in accordance with ISO 11357

Examples 10 to 16 and Comparative Examples 6 to 10

The procedure of Example 9 was repeated, except that phenol-modified diols shown in Table 1 were used instead of phenol-modified diol (A-2) and PTBP was added in an amount shown in Table 1, to thereby yield PC copolymers. In a manner similar to that employed in Example 9, viscosity number, copolymerization proportion, and glass transition temperature Tg of the PC copolymers were determined. Table 1 shows the results.

TABLE 1

| | | Ex. 9 | Ex. 10 | Ex. 11 | Comp. Ex. 6 | Ex. 12 | Ex. 13 | Comp. Ex. 7 |
|---|---|---|---|---|---|---|---|---|
| Phenol-modified diol | Type | A-2 | | A-4 | A-1 | B-2 | B-3 | B-1 |
| | Mn of PTMG or PEG | 1,000 | 1,000 | 1,000 | 1,000 | 2,000 | 2,000 | 2,000 |
| | p-hydroxybenzoic acid [mass ppm] | 90 | 90 | 400 | 900 | 10> | 10> | 1200 |
| | p-hydroxybenzoic acid methyl ester [mass %] | 0.2 | 0.8 | 0.9 | 0.9 | 0.4 | 0.9 | 0.9 |
| Amount of PTBP used [g] | | 1.33 | 1.33 | 1.33 | 1.33 | 1.26 | 1.26 | 1.26 |
| Volume of separated aqueous phase [mL]* | Separation of polymerization liquid | 9.0 | 9.0 | 5.0 | 0 | 9.0 | 9.0 | 0 |
| | Volume of separated aqueous phase after washing with alkali | 9.0 | 7.5 | 4.0 | 0 | 9.0 | 7.0 | 0 |
| PC copolymer | Viscosity number | 45.8 | 46.0 | 45.0 | 44.0 | 47.7 | 47.0 | 47.6 |
| | Co-polymerization proportion [mass %] | 8.9 | 8.9 | 8.9 | 8.9 | 8.9 | 8.9 | 8.9 |
| | Tg [° C.] | 113 | 113 | 113 | 113 | 108 | 108 | 108 |

| | | Ex. 14 | Comp. Ex. 8 | Ex. 15 | Comp. Ex. 9 | Ex. 16 | Comp. Ex. 10 |
|---|---|---|---|---|---|---|---|
| Phenol-modified diol | Type | C-2 | C-1 | D-2 | D-1 | E-2 | E-1 |
| | Mn of PTMG or PEG | 600 | 600 | 2,900 | 2,900 | 400 | 400 |
| | p-hydroxybenzoic acid [mass ppm] | 10> | 1200 | 80 | 800 | 10> | 900 |
| | p-hydroxybenzoic acid methyl ester [mass %] | 0.4 | 0.5 | 0.9 | 0.9 | 0.2 | 0.2 |

TABLE 1-continued

|  |  | | | | | | |
|---|---|---|---|---|---|---|---|
| Amount of PTBP used [g] | | 1.75 | 1.75 | 1.75 | 1.75 | 1.26 | 1.26 |
| Volume of separated aqueous phase [mL]* | Separation of polymerization liquid | 9.0 | 0 | 9.0 | 1.5 | 8.0 | 0 |
| | Volume of separated aqueous phase after washing with alkali | 9.5 | 0 | 9.5 | 0 | 7.5 | 0 |
| PC copolymer | Viscosity number | 40.0 | 40.0 | 39.2 | 39.0 | 47.4 | 47.4 |
| | Co-polymerization proportion [mass %] | 8.8 | 8.8 | 8.8 | 8.8 | 8.9 | 8.9 |
| | Tg [° C.] | 110 | 110 | 103 | 103 | 111 | 111 |

*After each sample had been left to stand for one hour

Comparative Example 11

Into a flask (inner volume: 1 L) equipped with a nitrogen conduit, a vacuum apparatus, a thermometer, and a stirrer, polytetramethylene glycol (Mn (number average molecular weight)=2000) (200 g, 0.1 mol), methyl p-hydroxybenzoate (30.4 g, 0.2 mol), tetrabutyl titanate (2 mL), and magnesium acetate (0.5 g) were placed. The mixture was heated to 80 to 100° C. under nitrogen until the mixture was melted. Subsequently, the molten mixture was gradually heated to 230° C. in vacuum. The mixture was cooled in vacuum, whereby the corresponding polytetramethylene glycol bis(p-hydroxybenzoic acid ester) was yielded. The impurity content of the compound is shown in Table 2.

Example 17

The compound (50 g) obtained in Comparative Example 11 was dissolved in methylene chloride (400 mL), and the solution was transferred into a flask (inner volume: 2 L) equipped with a stirrer. A 0.3-mol/L aqueous $NaHCO_3$ solution (400 mL) was added to the above methylene chloride solution with mixing, and the mixture was allowed to stand, whereby the methylene chloride phase was separated from the liquid. The methylene chloride phase was mixed with water (200 mL), and the mixture was allowed to stand, to thereby collect another methylene chloride phase. Methylene chloride was removed from the phase by means of an evaporator, and the residue was dried at 40° C. under reduced pressure for one night. The impurity content of the thus-obtained purified product is shown in Table 2.

Example 18

The procedure of Comparative Example 11 was repeated, except that polyethylene glycol (Mn=3400) (340 g, 0.1 mol) was used instead of polytetramethylene glycol, to thereby yield the polyethylene glycol bis(p-hydroxybenzoic acid ester). The compound was purified in a manner similar to that employed in Example 17. The impurity content of the thus-obtained purified compound is shown in Table 2.

Comparative Example 12

Into a reactor equipped with a protective gas conduit, polytetramethylene glycol (Mn=1000) (800 g, 0.8 mol) and methyl p-hydroxybenzoate (243 g, 1.6 mol) were placed, and the mixture was heated at 140° C. so as to homogenize the mixture. Tin octanate (3.9 g) was added to the mixture, followed by heating to 180° C., whereby release of methanol was initiated. After completion of release of methanol, the mixture was stirred at 180° C. for one hour, and the product was cooled, to thereby yield the corresponding polytetramethylene glycol bis(p-hydroxybenzoic acid ester). The impurity content of the compound is shown in Table 2.

Example 19

The compound produced in Comparative Example 12 (50 g) was purified in a manner similar to that employed in Example 17. The impurity content of the thus-obtained purified compound is shown in Table 2.

Example 20

The compound produced in Comparative Example 12 (50 g) was dissolved in a 0.5-mol/L aqueous sodium hydroxide solution (400 mL), and the solution was transferred into a flask (inner volume: 2 L) equipped with a stirrer and stirred for one hour. A 2-mol/L hydrochloric acid was gradually added dropwise to the solution, to thereby regulate pH to 9. Methylene chloride (400 mL) was added to the solution, and the mixture was allowed to stand, whereby the methylene chloride phase was separated from the liquid. The methylene chloride phase was mixed with water (200 mL), and the mixture was allowed to stand, to thereby collect another methylene chloride phase. Methylene chloride was removed from the phase by means of an evaporator, and the residue was dried at 40° C. under reduced pressure for one night. The impurity content of the thus-obtained purified product is shown in Table 2.

Comparative Example 13

Into a reactor (inner volume: 1 L) equipped with a Dean-Stark apparatus and a nitrogen conduit, polytetramethylene glycol (Mn=1000) (500 g, 0.5 mol), p-hydroxybenzoic acid (138 g, 1.0 mol), titanium potassium oxalate (0.26 g, 0.0007 mol), and xylene (100 g) were placed, and the mixture was allowed to dehydration-condense (esterify) at 190° C. under reflux conditions with xylene. The reaction completed for five hours. After completion of the reaction, xyluene was distilled out, to thereby yield the corresponding polytetramethylene glycol bis(p-hydroxybenzoic acid ester). The impurity content of the compound is shown in Table 2.

Example 21

The compound produced in Comparative Example 13 (50 g) was purified in a manner similar to that employed in Example 17. The impurity content of the thus-obtained purified compound is shown in Table 2.

TABLE 2

|  | p-Hydroxybenzoic acid (ppm by mass) | Methyl p-hydroxybenzoate (mass %) |
|---|---|---|
| Comp. Ex. 11 | 800 | 0.6 |
| Ex. 17 | 10 | 0.4 |
| Ex. 18 | 50 | 0.4 |
| Comp. Ex. 12 | 1,000 | 1.5 |
| Ex. 19 | 100 | 1.2 |
| Ex. 20 | 200 | 0.3 |
| Comp. Ex. 13 | 6,000 | Not detected |
| Ex. 21 | 400 | Not detected |

Comparative Example 14 (Production of PC Copolymer)

(1) PC Oligomer Preparation Step

BPA was dissolved in a 5.6-mass % aqueous sodium hydroxide solution in such an amount that the bisphenol (BPA) concentration was adjusted to 13.5 mass %, whereby an aqueous sodium hydroxide solution of BPA was prepared. The aqueous sodium hydroxide solution of bisphenol A was continuously fed to a tube reactor (inner diameter: 6 mm, tube length: 30 m) at 40 L/hr, and methylene chloride and phosgene were also continuously fed to the reactor at 15 L/hr and 4.0 kg/hr, respectively. The tube reactor has a jacket section, through which cooling water was circulated so as to maintain the reaction mixture at 40° C. or lower.

The reaction mixture supplied through the tube reactor was continuously fed to a tank reactor (inner volume: 40 L) equipped with a retreated blade and a baffle plate. To the tank reactor, the aqueous sodium hydroxide solution of BPA (2.8 L/hr), a 25-mass % aqueous sodium hydroxide solution (0.07 L/hr), water (17 L/hr), and a 1-mass % aqueous triethylamine solution (0.64 L/hr) were fed, and the mixture was allowed react at 29 to 32° C. The reaction mixture was continuously removed from the tank reactor and allowed to stand, whereby the aqueous phase was separated out and the methylene chloride phase was collected. The thus-produced polycarbonate oligomer solution was found to have an oligomer concentration of 329 g/L and a chloroformate concentration of 0.74 mol/L.

(2) Polymerization Step for Producing PC Copolymer

Into a tank reactor (inner volume: 1 L) equipped with four baffle plates and a paddle-form agitation blade, the oligomer solution (137 mL) obtained in the step (1) above, methylene chloride (88 mL), and the compound produced in Comparative Example 11 (5 g) were placed. Subsequently, triethylamine (85 µL) were added to the reactor. To the mixture, a 6.4-mass % aqueous sodium hydroxide solution (18 mL) was added under stirring, and the mixture was allowed to react for 10 minutes.

To the reaction mixture, p-tert-butylphenol (1.18 g) dissolved in methylene chloride (10 mL) and bisphenol A (8.1 g) dissolved in a 6.4-mass % aqueous sodium hydroxide solution (71 mL) were added, and the resultant mixture was allowed to react for further 50 minutes.

(3) Washing Step

Methylene chloride (100 mL) was added to the reaction mixture obtained in the step (2) above, and the resultant mixture (50 mL) was taken into a 50-mL messcylinder with continuous stirring, and allowed to stand. The separation status of the solution in the messcylinder was observed. The time required for the methylene chloride phase to be separated in the system was measured. The time was evaluated as separation time.

From the remaining solution, the methylene chloride phase was removed. The solution was sequentially washed with 15 vol. % (with respect to the solution) of an 0.03-mol/L aqueous sodium hydroxide solution, with 0.2-mol/L hydrochloric acid, and twice with pure water. The aqueous phase was confirmed to have an electrical conductivity of 0.01 µS/m or less after washing.

(4) Flake Production Step

A methylene chloride solution of the PC resin obtained in the step (3) above was condensed, followed by pulverization, to thereby form resin flakes. The thus-produced flakes were dried at 100° C. under reduced pressure. Viscosity number of the PC resin was determined in accordance with ISO 1628-4 (1999). The results are shown in Table 3.

Examples 22 to 26 and Comparative Examples 15 and 16

The procedure of Comparative Example 14 including 14(2) was repeated, except that compounds obtained in Examples 17 to 21 and Comparative Examples 12 and 13 were used instead of the compound obtained in Comparative Example 11. The same measurement was performed. The results are shown in Table 3.

TABLE 3

|  | Comonomer | Separation time (min) | Viscosity number of PC |
|---|---|---|---|
| Comp. Ex. 14 | Comp. Ex. 11 | 58 | 47.0 |
| Ex. 22 | Ex. 17 | 14 | 46.6 |
| Ex. 23 | Ex. 18 | 18 | 47.2 |
| Comp. Ex. 15 | Comp. Ex. 12 | ≧60 | 46.5 |
| Ex. 24 | Ex. 19 | 30 | 46.2 |
| Ex. 25 | Ex. 20 | 19 | 45.8 |
| Comp. Ex. 16 | comp. Ex. 13 | ≧60 | 45.7 |
| Ex. 26 | Ex. 21 | 28 | 46.0 |

INDUSTRIAL APPLICABILITY

According to the present invention, a PC copolymer having a specific structure can be produced from a diester diol serving as a starting material at high productivity.

In addition, through use of the comonomer of the present invention for producing a PC resin, a PC copolymer can be produced at high productivity.

The invention claimed is:

1. A method for producing a polycarbonate copolymer comprising structural repeating units represented by formulas (I) and (II):

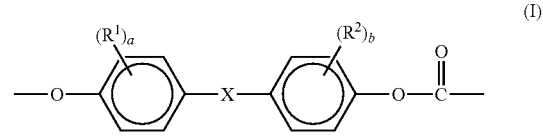

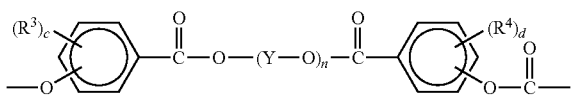
(II)

wherein each of $R^1$ and $R^2$ independently represents a C1 to C6 alkyl group; X represents a single bond, a C1 to C8 alkylene group, a C2 to C8 alkylidene group, a C5 to C15 cycloalkylene group, a C5 to C15 cycloalkylidene group, —S—, —SO—, —SO$_2$—, —O—, —CO—, or a group represented by formula (III-1) or (III-2):

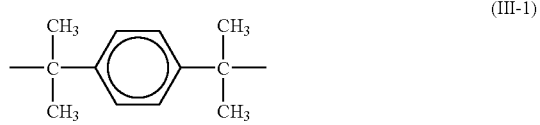
(III-1)

(III-2)

each of $R^3$ and $R^4$ independently represents a C1 to C3 alkyl group; Y represents a C2 to C15 linear-chain or branched alkylene group; a to d are independently integers of 0 to 4; and n is an integer of 2 to 450, by reacting (A) a dihydric phenol, (B) a phenol-modified diol and (C) a carbonate precursor, wherein the phenol-modified diol (B) is represented by formula (IIa) and comprises 500 ppm by mass or less of a hydroxybenzoic acid:

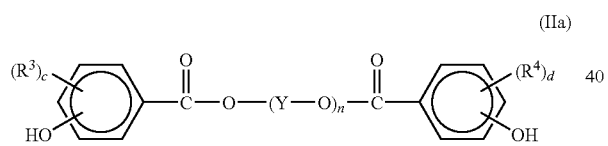
(IIa)

where $R^3$, $R^4$, Y, c, d and n are as defined above.

2. A method for producing a polycarbonate copolymer as described in claim 1, wherein the phenol-modified diol has a hydroxybenzoic acid alkyl ester content of 1.0 mass % or less.

3. A method for producing a polycarbonate copolymer as described in claim 1, wherein the hydroxybenzoic acid is p-hydroxybenzoic acid.

4. A method for producing a polycarbonate copolymer as described in claim 2, wherein the hydroxybenzoic acid alkyl ester is a p-hydroxybenzoic acid alkyl ester.

5. A comonomer represented by formula (IIa):

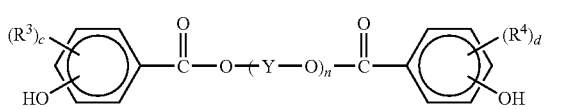
(IIa)

wherein each of $R^3$ and $R^4$ independently represents a C1 to C3 alkyl group; Y represents a C2 to C15 linear-chain or branched alkylene group; c and d are independently integers of 0 to 4; and n is an integer of 2 to 450, wherein the amount of a hydroxybenzoic acid represented by formula (IV) present therein is 500 ppm by mass or less:

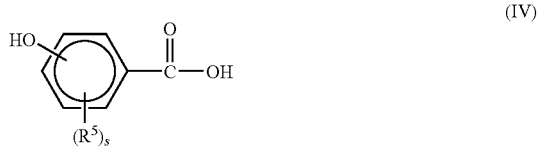
(IV)

wherein $R^5$ is a C1 to C3 alkyl group, and s is an integer of 0 to 4.

6. A comonomer as claimed in claim 5, in which the amount of a hydroxybenzoic acid alkyl ester represented by formula (V) therein is 1.0 mass % or less:

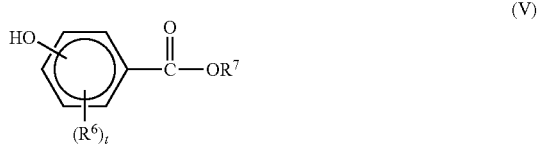
(V)

wherein $R^6$ is a C1 to C3 alkyl group; $R^7$ is a C1 to C10 alkyl group; and t is an integer of 0 to 4.

7. A comonomer as described in claim 5, wherein n in formula (IIa) is 2 to 200.

8. A comonomer as described in claim 5, which is produced through esterification between a poly(alkylene ether glycol) and a hydroxybenzoic acid represented by formula (IV):

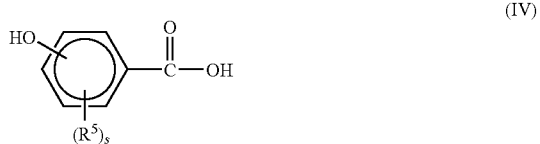
(IV)

wherein $R^5$ is a C1 to C3 alkyl group, and s is an integer of 0 to 4 and/or a hydroxybenzoic acid alkyl ester represented by formula (V):

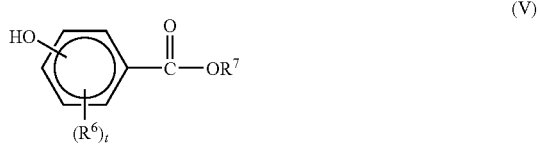
(V)

wherein $R^6$ is a C1 to C3 alkyl group; $R^7$ is a C1 to C10 alkyl group; and t is an integer of 0 to 4.

9. A method for producing a comonomer comprising esterifying a poly(alkylene ether glycol) with a hydroxybenzoic acid represented by formula (IV):

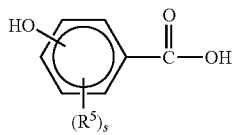

(IV)

wherein $R^5$ is a C1 to C3 alkyl group, and s is an integer of 0 to 4 and/or a hydroxybenzoic acid alkyl ester represented by formula (V):

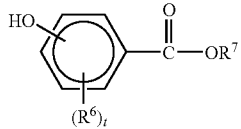

(V)

wherein $R^6$ is a C1 to C3 alkyl group; $R^7$ is a C1 to C10 alkyl group; and t is an integer of 0 to 4, to yield a reaction mixture comprising a compound represented by formula (IIa):

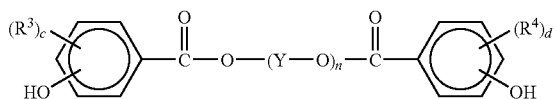

(IIa)

wherein each of $R^3$ and $R^4$ independently represents a C1 to C3 alkyl group; Y represents a C2 to C15 linear-chain or branched alkylene group; c and d are independently integers of 0 to 4; and n is an integer of 2 to 450, and, subsequently, treating the reaction mixture with an aqueous alkaline solution.

10. A method for producing a comonomer as described in claim 9, wherein the aqueous alkaline solution has a pH of 8 to 11.

* * * * *